(12) United States Patent
Steelman

(10) Patent No.: US 7,559,598 B2
(45) Date of Patent: Jul. 14, 2009

(54) TRIM PANEL INCLUDING INTEGRALLY FORMED MEMBERS

(75) Inventor: James Lloyd Steelman, Sterling Heights, MI (US)

(73) Assignee: Intier Automotive Inc., Newmarket (CA)

( * ) Notice: Subject to any disclaimer, the term of this patent is extended or adjusted under 35 U.S.C. 154(b) by 686 days.

(21) Appl. No.: 11/189,674

(22) Filed: Jul. 26, 2005

(65) Prior Publication Data

US 2007/0024082 A1    Feb. 1, 2007

(51) Int. Cl.
    *B60J 5/00*    (2006.01)
(52) U.S. Cl. .................. 296/146.7; 296/39.1; 52/716.3; 52/716.5
(58) Field of Classification Search .................... 52/208, 52/716.3, 716.5; 296/146.7, 39.1
    See application file for complete search history.

(56) References Cited

U.S. PATENT DOCUMENTS

| | | | |
|---|---|---|---|
| 6,412,852 B1 | 7/2002 | Koa et al. | |
| 7,032,955 B2 * | 4/2006 | Radu et al. | 296/146.7 |
| 7,055,887 B2 * | 6/2006 | Williams et al. | 296/146.7 |
| 7,059,659 B2 * | 6/2006 | Smith et al. | 296/146.7 |

* cited by examiner

*Primary Examiner*—Richard E Chilcot, Jr.
*Assistant Examiner*—Anthony N Bartosik
(74) *Attorney, Agent, or Firm*—Honigman Miller Schwartz and Cohn LLP

(57) ABSTRACT

A trim panel (10) includes at least one integrally-formed first member (12) and at least one integrally-formed second member (14) extend from an outboard surface (16) of the trim panel (10). The at least one integrally-formed first member (12) engages an inboard surface (42) of a barrier (36) to push the barrier (36) in an outboard direction. The at least one integrally-formed second member (14) extends through an opening or perforation (40) of the barrier (36) to retain the barrier (36) to the trim panel (10). The barrier (36) may be a water/acoustic ingression barrier (36). The at least one integrally-formed first member (12) causes an adhesive bead (44) arranged on an outboard surface (46) of the barrier (36) to positively engage an inboard surface (48) of an inner door panel (38). The at least one integrally-formed second member (14) extends through an opening or perforation (40) of the barrier (36) to retain the barrier (36) with the interior door trim panel (10).

6 Claims, 6 Drawing Sheets

TRIM PANEL INCLUDING INTEGRALLY FORMED MEMBERS

TECHNICAL FIELD

The disclosure generally relates to trim panels. More particularly, the disclosure relates to interior trim panels, such as a vehicular door trim panel, with integrally-formed members for engaging a barrier, such as a water/acoustic barrier.

BACKGROUND

Barriers for preventing water ingression, acoustic ingression, and the like have been typically located between an outer, sheet-metal door portion and an interior door trim portion. Referring to FIGS. 4 and 5, a conventional door assembly is shown generally at 100 and includes the interior door trim portion 102, the barrier portion 104, and an outer, sheet-metal door assembly including an outer panel portion 106 and an inner panel portion 107. As illustrated, the trim portion 102 includes a molded boss portion 108 that receives a head portion 110 (FIG. 6) of a fastener portion 112.

The door assembly 100 is assembled by inserting the fastener portions 112 through the barrier portion 104 and inner panel portion 107. To maintain the desired positioning of the barrier portion 104, an adhesive strip or bead 114 is provided on an outboard side 116 of the barrier portion 104 to affix the barrier portion 104 to the inner panel portion 107. To ensure that the adhesive strip or bead 114 adheres to the inner panel portion 107, compressible foam plastic portions 118 are placed between the trim portion 102 and an inboard surface 120 of the barrier portion 104. In addition to ensuring that the adhesive strip or bead 114 adheres to the inner panel portion 107, the foam plastic portions 118 provide supplemental sound attenuation features.

Although adequate for most applications by preventing the ingression of water and acoustics into the vehicle, the door assembly 100 requires a series of manufacturing steps and a plurality of parts. For instance, the fastener portions 112 must be stocked at the assembly location for connection to the molded boss portion 108 of the interior door trim portion 102. Then, the plastic foam portions 118 must also be stocked at the assembly location for positioning against the interior door trim portion 102. Then, the barrier portion 104 is placed over the plastic foam portions 118 as the fastener portions 112 extend through the barrier portion 104. Upon completing this sub-assembly, which is generally shown at 122 (FIG. 6), the fastener portions 112 may engage the inner panel portion 107 to complete the door assembly 100.

Accordingly, a need exists to reduce the number of parts and manufacturing steps associated with conventional door assemblies.

BRIEF DESCRIPTION OF THE DRAWINGS

The disclosure will now be described, by way of example, with reference to the accompanying drawings, in which.

DETAILED DESCRIPTION

Figure 1A:
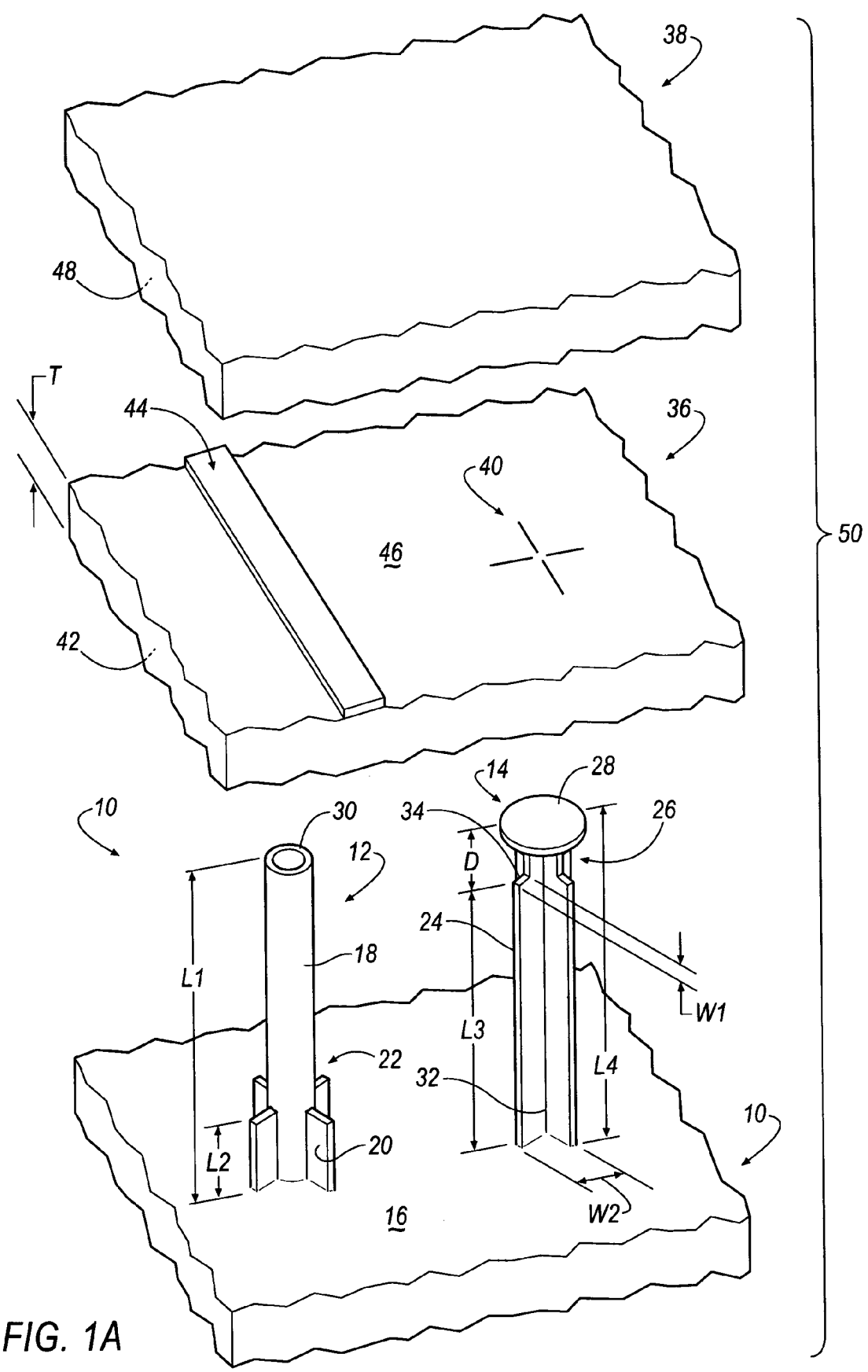
FIG. 1A illustrates an exploded view of an assembly including a trim panel according to an embodiment.
Figure 2A:
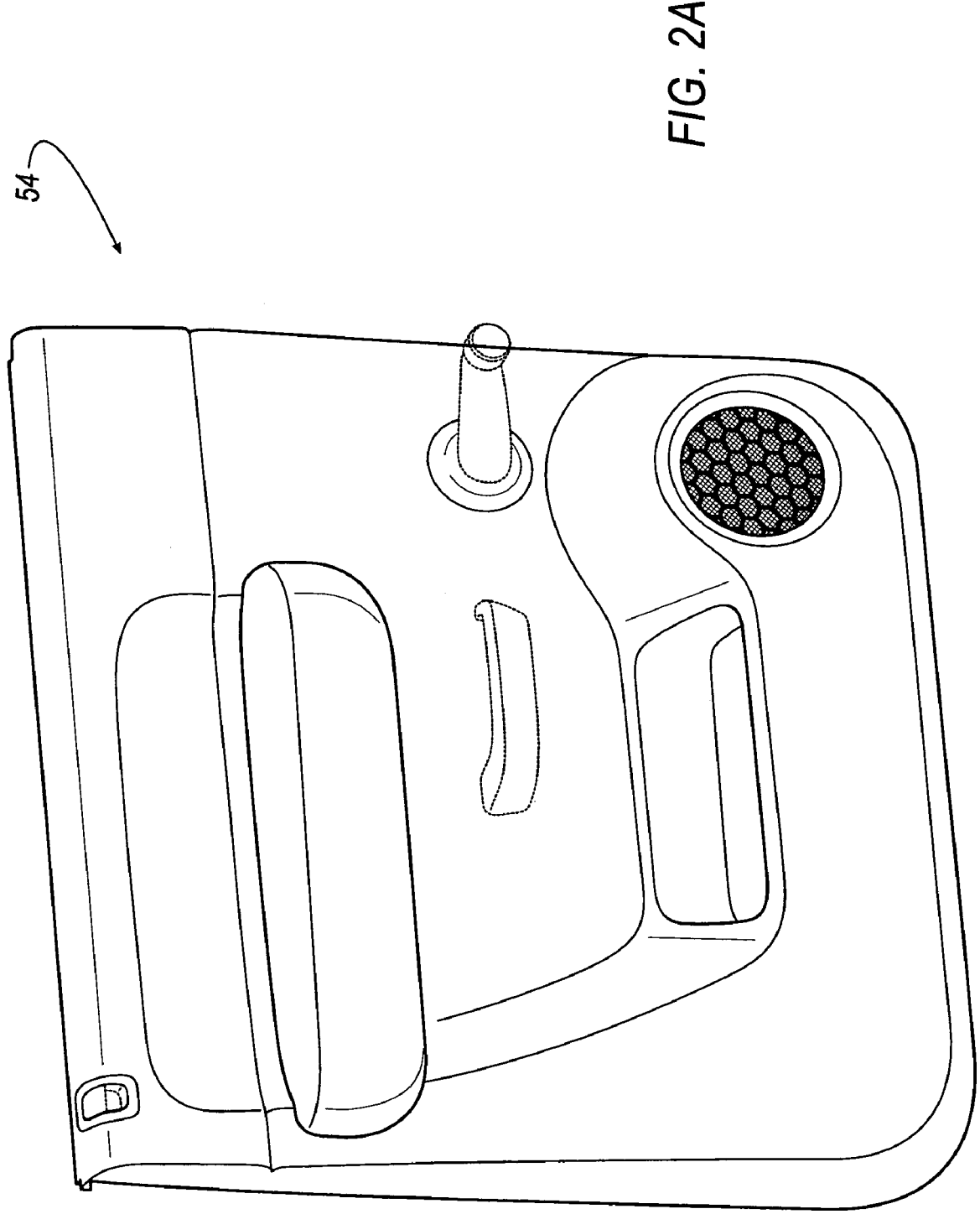
FIG. 2A is an inboard perspective view of a vehicular door trim portion according to an embodiment.
Figure 2B:
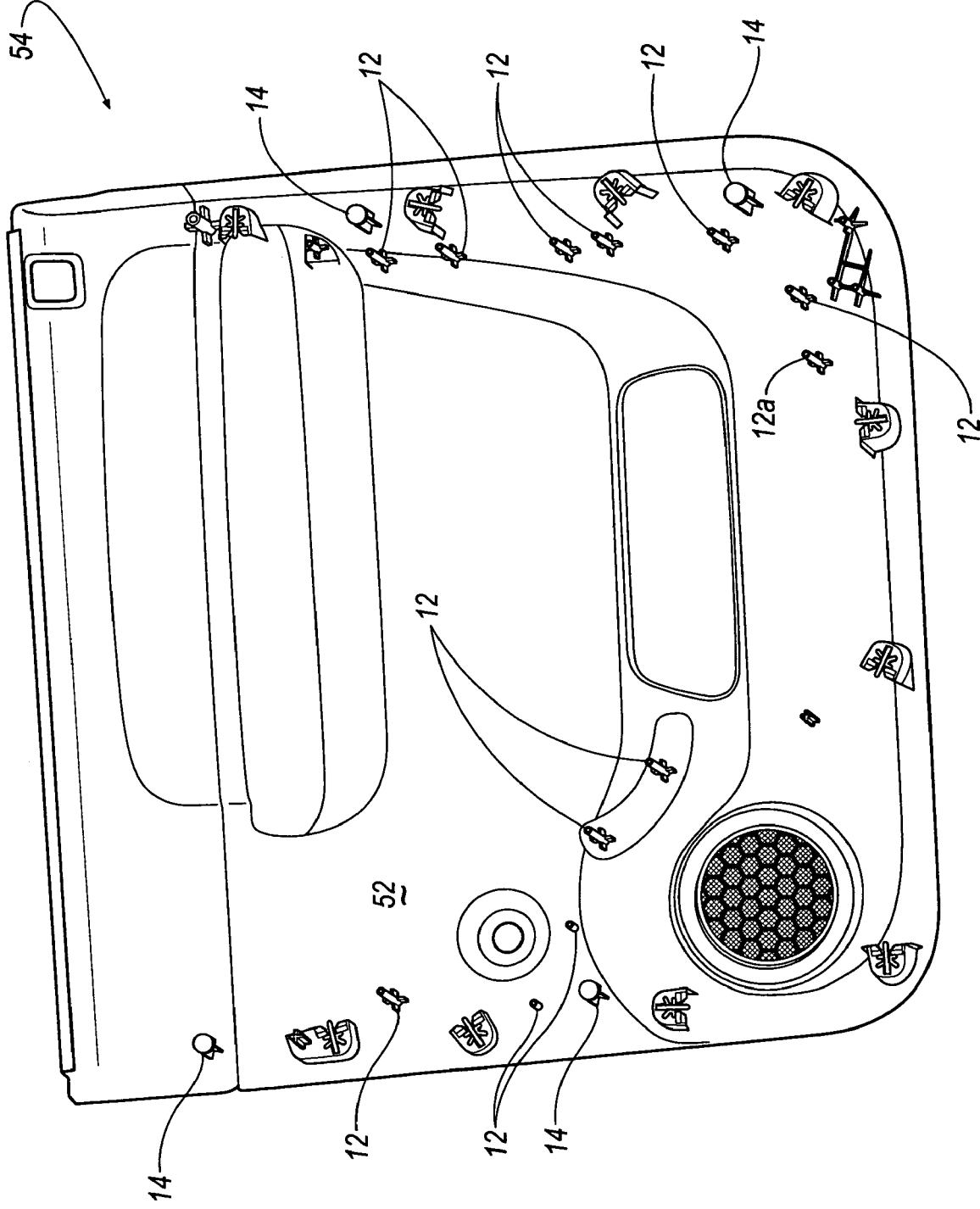
FIG. 2B is an outboard perspective view of the vehicular door trim portion of FIG. 2A.

Referring to FIG. 1A, a trim panel is shown generally at 10 and includes members 12, 14 that extend from and are integrally-formed with the trim panel 10. "Integrally-formed with" is defined in this description to mean that the trim panel 10 and members 12, 14 are formed as a single piece of the same material. As illustrated, the members 12, 14 extend from an outboard surface 16 of the trim panel 10. Although the outboard surface 16 of the trim panel 10 is illustrated as a substantially flat surface, it will be appreciated that the outboard surface 16 may have any desirable contour such that the trim panel 10 may be shaped to take the form of any interior trim panel such as, for example, a vehicular door trim panel (FIGS. 2A and 2B). The trim panel 10 and integrally-formed members 12, 14 may include any desirable thermoplastic resin, such as, for example, Acrylonitrile-Butadiene-Styrene (ABS), and may be formed in any desirable injection molding procedure.

The integrally-formed member, which is shown generally at 12, is hereinafter referred to as a pusher. The pusher 12 includes a stem portion 18 and finned portions 20. The stem portion 18 is formed to include a cylindrical, tube shape and extends substantially perpendicularly from the outboard surface 16 at a length, L1, that terminates at a top portion 30. If desired, the stem portion 18 may be formed to be a substantially solid cylinder rather than a tube; however, a substantially solid cylindrical shape may cause surface imperfections on the opposite, inboard side (not shown) of the trim panel 10 during molding.

As illustrated, the finned portions 20 extend radially from the stem portion 18 and substantially perpendicularly from the outboard surface 16, proximate a lower portion 22 of the stem portion 18. The finned portions 20 extend substantially perpendicularly from the outboard surface 16 at a length, L2, approximately one-fifth the length, L1, of the stem portion 18. Functionally, the finned portions 20 provide stability to the lower portion 22 of the stem portion 18 to prevent the stem portion 18 from shearing off of the outboard surface 16. According to an embodiment, if the height of the pusher 12 is less than 10.0 mm, the finned portions 20 may be omitted. Although four finned portions 20 are illustrated, it will be appreciated that the pusher 12 may include any desirable number of finned portions 20.

The integrally-formed member, which is shown generally at 14, is hereinafter referred to as a retainer. The retainer 14 includes finned portions 24 and a neck portion 26 that terminates at a substantially planar, round head portion 28. The head portion 28 and the top portion 30 of the stem portion 18 terminate substantially in a same plane. Similar to the design of the pusher 12, the finned portions 24 of the retainer 14 extend radially from a central column 32 and substantially perpendicularly from the outboard surface 16 to prevent shearing of the retainer 14 from the outboard surface 16 of the trim panel 10. The finned portions 24 terminate at flats 34 proximate the neck portion 26. As described below, the flats 34 provide support for a barrier 36. The distance, D, is approximately equal to a thickness, T, of the barrier 36. Each flat 34 includes a first width, W1, approximately equal to two-thirds a second width, W2, of each finned portion 24. The finned portions 24 may include any desirable length, L3.

Figure 1B:
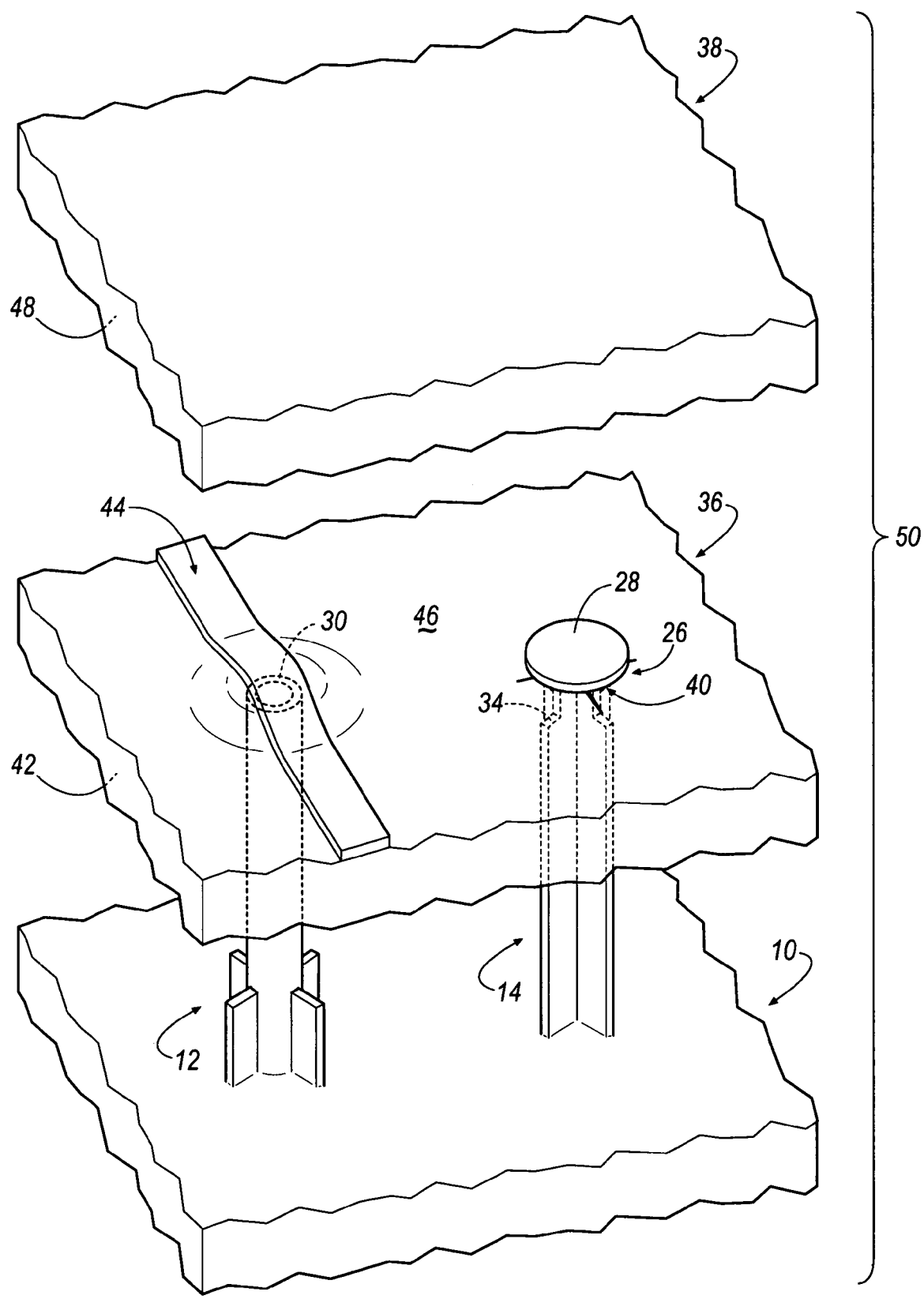
FIG. 1B illustrates a partially assembled view of the assembly of FIG. 1A.

As illustrated, the trim panel 10 is part of an assembly, which is shown generally at 50. The assembly 50 includes the trim panel 10, the barrier 36, and an inner panel 38. According to an embodiment, the assembly 50 may be a vehicular door assembly in which the barrier 36 may function as a water/acoustic barrier, and the inner panel 38 may be a sheet-metal or composite inner door portion. As illustrated in FIG. 1B, the head portion 28 of the retainer 14 extends through an opening or perforation 40 in the barrier 36. Upon passing the head portion 28 through the opening or perforation 40, the barrier 36 is located about the neck portion 26, between the head portion 28 and flats 34. Preferably, a plurality of retainers 14 are generally located proximate an outer perimeter or corners of the assembly 50; however, it will be appreciated that the retainers 14 may be located at any desirable location on the trim panel 10.

Once the barrier 36 is positioned about the neck portion 26 as described above, the top portion 30 of the stem portion 18 engages an inboard surface 42 of the barrier 36. The pushers 12 are selectively located on the outboard surface 16 of the trim panel 10 in a pattern similar to that of an adhesive strip or bead 44 that is patterned on an outboard surface 46 of the barrier 36. Accordingly, once the inner panel 38 is attached to the trim panel 10 with fasteners (not shown), the top portions 30 of the pushers 12 apply a pressure on the inboard surface 42 of the barrier 36 to cause the adhesive bead 44 to positively adhere to an inboard surface 48 of the inner panel 38.

Referring to FIGS. 2A and 2B, pushers 12, 12a and retainers 14 are located on an outboard surface 52 of an interior door trim panel 54. As illustrated, four retainers 14 are positioned proximately at corners on the outboard surface 52 of the door trim panel 54 as described above to retain a barrier, and thirteen pushers 12, 12a are selectively located on the outboard surface 52 of the trim panel 54 to apply pressure to an inboard surface of a barrier proximate an adhesive bead located on an opposite, outboard side of the barrier as described above. The pusher, which is identified generally at 12a, may also function as a two-way locator for positioning add-on components, such as, for example, a map-pocket. Although four retainers 14 and thirteen pushers 12 are shown in FIG. 2B, it will be appreciated that any desirable number of pushers 12 and retainers 14 may be integrally formed with the interior door trim panel 54.

Figure 3:
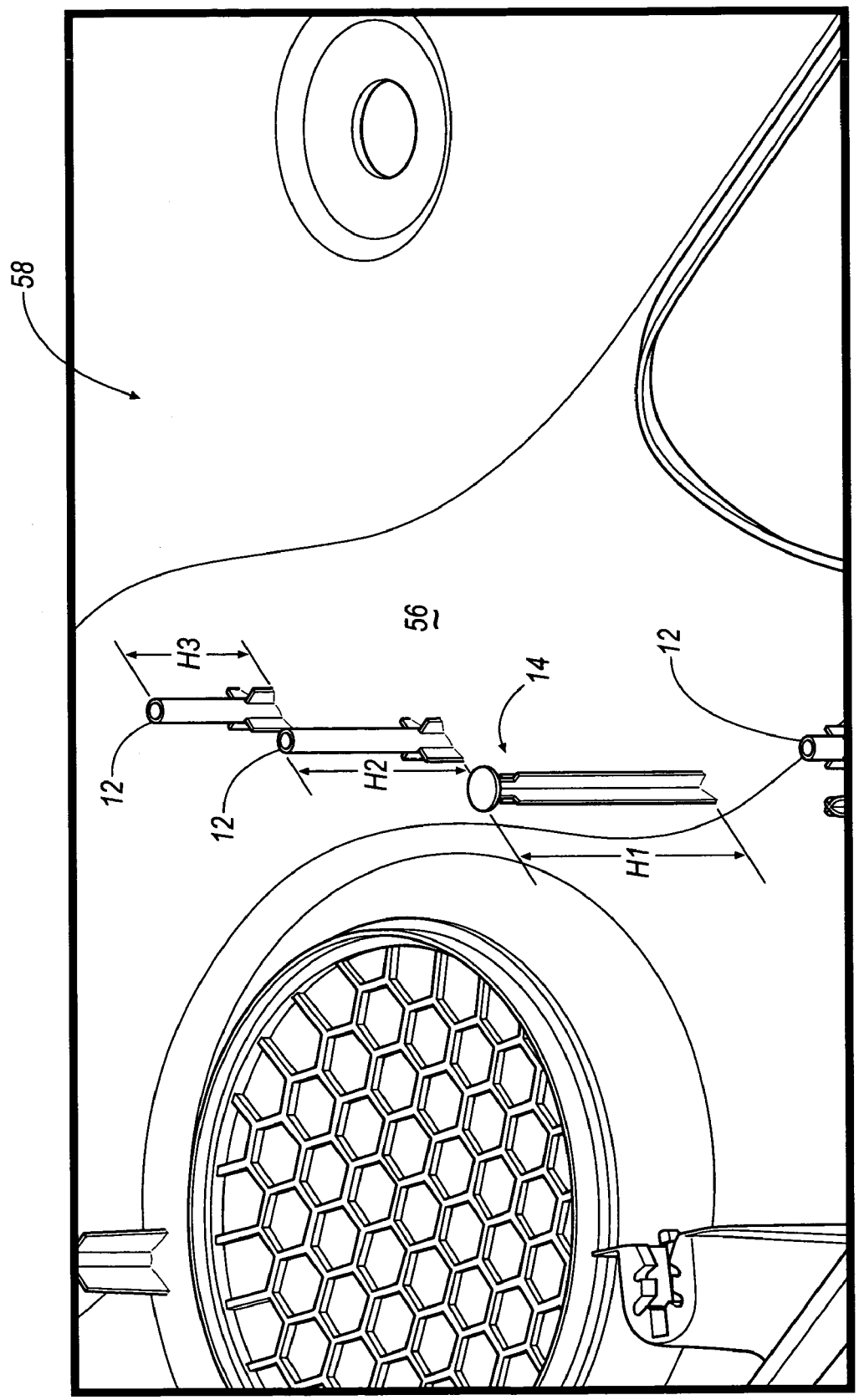
FIG. 3 is an enlarged view of an outboard perspective view of a vehicular door trim portion according to an embodiment.
Figure 4:
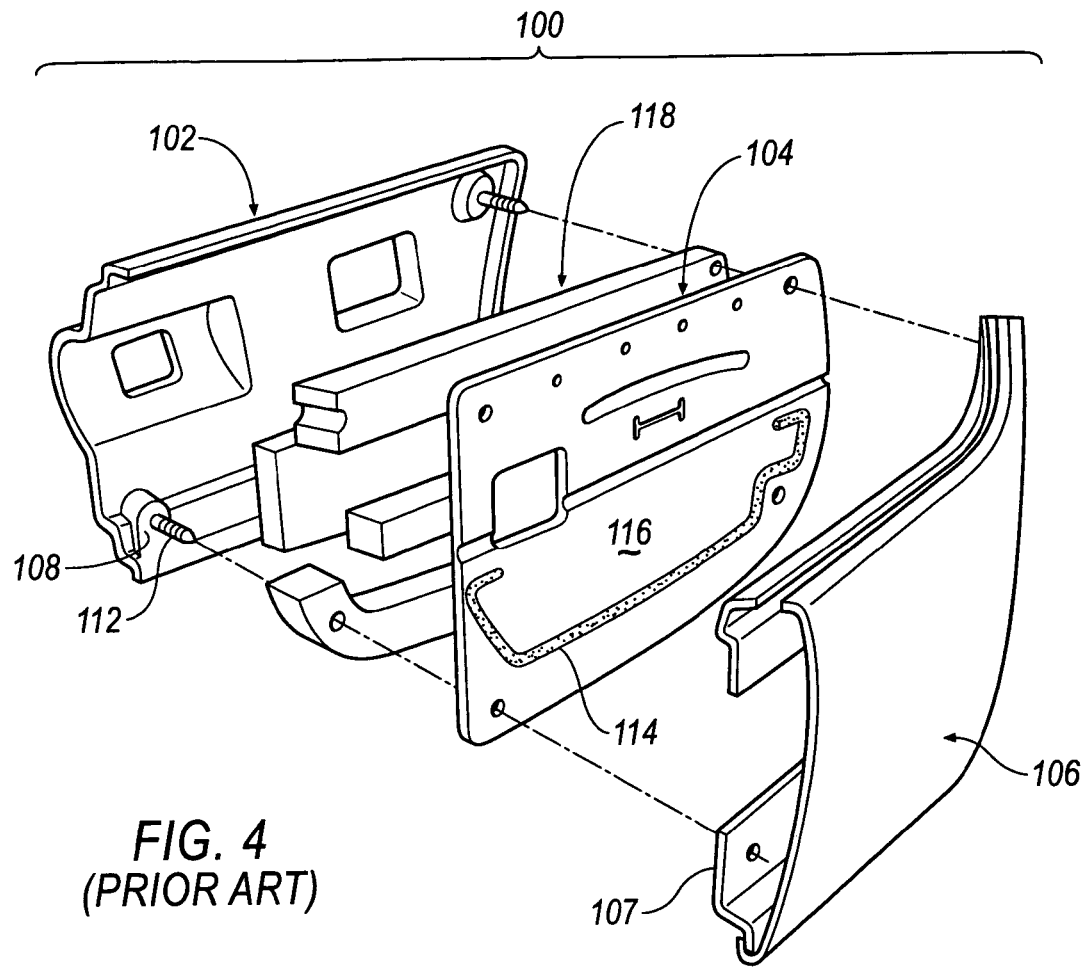
FIG. 4 is a perspective view of a conventional vehicular door assembly.
Figure 5:
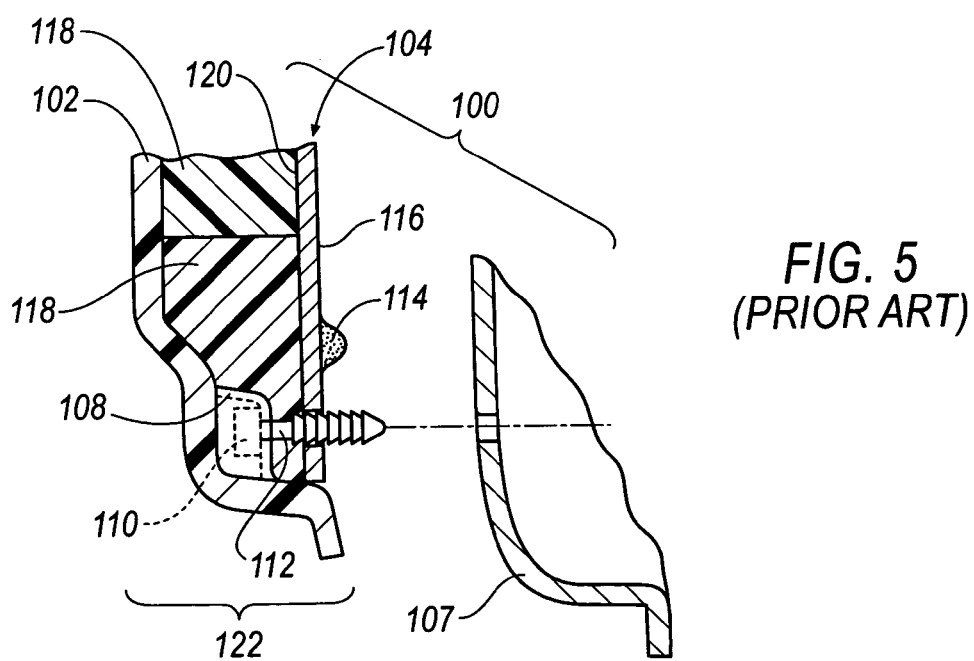
FIG. 5 is a cross-sectional view of the conventional vehicular door assembly of FIG. 4.

As seen in FIG. 3, retainers 14 and pushers 12 may be located on an inboard surface 56 of a door trim panel 58 that has a varying, non-planar, outboard contour. Accordingly, the pushers 12 and retainers 14 are designed with different heights, H1-H3, while terminating substantially in a common plane. Although not illustrated, retainers 14 and pushers 12 may also be formed on an outboard surface of secondary components that may be attached to the interior door trim panel. The secondary component may be, for example, a map pocket, or the like.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A door panel system comprising:
   an inner panel,
   an interior trim panel having an outboard surface, the interior trim panel comprising at least one integrally-formed first member and at least one integrally-formed second member extending from the outboard surface of the interior trim panel, the first member comprising a cylindrical stem with a distal end and a base portion; the second member adjacent the first member and comprising extensions terminating at a head portion located at a distal end of the second member; and
   a barrier disposed between the inner panel and the interior trim panel, the barrier having a first side and a second side, the first side facing the interior trim panel and the second side facing the inner panel, the barrier further comprising at least one opening and an adhesive bead disposed on the second side directly opposite the first member;
   the first member and second member of the interior trim panel assembly interacting with the barrier such that the distal end of the second member extends through the opening and the head portion retains the barrier, and the distal end of the first member pushes on the first side of the barrier but does not extend through the barrier, causing the adhesive bead to adhere to the inner panel.

2. The door panel system according to claim 1, wherein the integrally-formed first member comprises finned portions that extend radially from the cylindrical stem and substantially perpendicular from the outboard surface, proximate the base portion of the cylindrical stem, wherein the finned portions provide stability to the base portion of the cylindrical stem to prevent the cylindrical stem from shearing off of the outboard surface, and wherein the distal end of the first member includes a surface substantially parallel to the outboard surface of the interior trim panel.

3. The door panel system according to claim 1, wherein the integrally-formed second member comprises finned portions and a neck portion disposed below the head portion, wherein the finned portions of the integrally-formed second member extend radially from a central column and substantially perpendicularly from the outboard surface, wherein the finned portions terminate at flats proximate the neck portion.

4. The door panel system according to claim 3, wherein the flats are spaced from the head portion at a distance, wherein each flat includes a first width approximately equal to four-fifths a second width of each finned portion.

5. The door panel system according to claim 3, wherein the head portion and the distal end of the integrally-formed first member terminates substantially in a same plane.

6. The door panel system according to claim 1, wherein the interior trim panel is a vehicular interior trim door panel, and wherein the inner panel is an inner vehicular door panel of door panel assembly including the inner door panel and outer door panel.

* * * * *